UNITED STATES PATENT OFFICE.

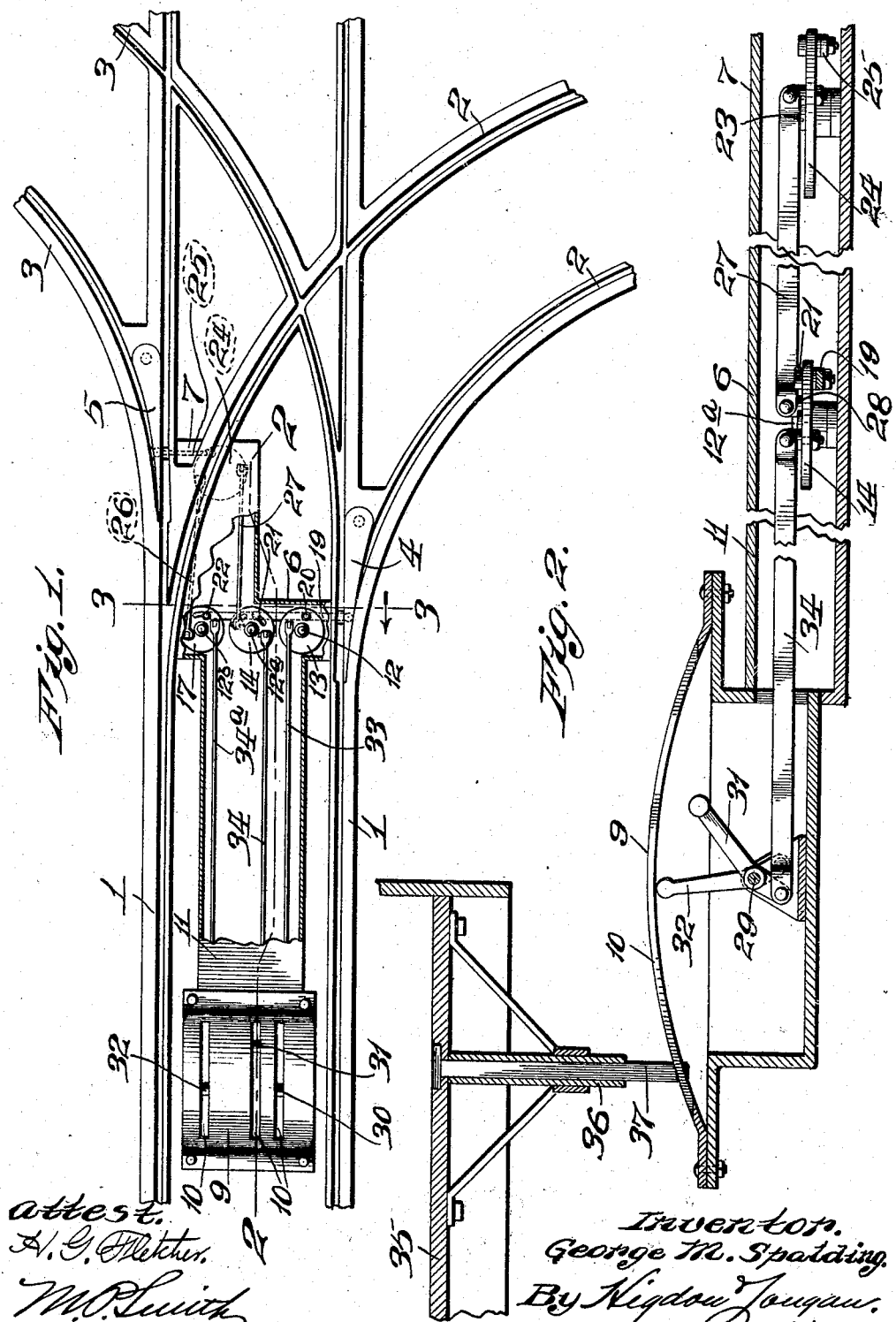

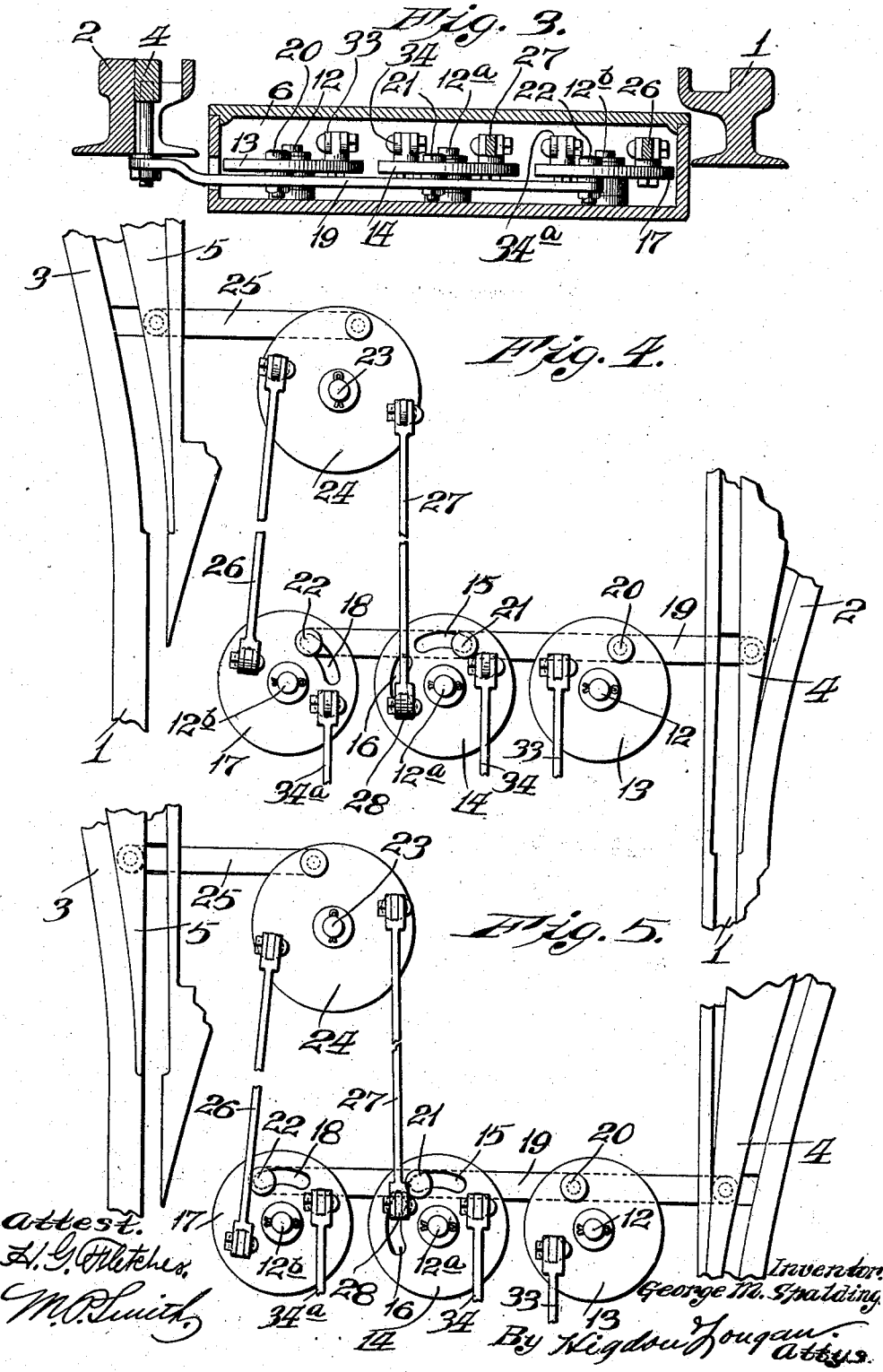

GEORGE M. SPALDING, OF ST. LOUIS, MISSOURI.

SWITCH-OPERATING DEVICE.

No. 923,590.  Specification of Letters Patent.  Patented June 1, 1909.

Application filed December 19, 1908. Serial No. 468,391.

*To all whom it may concern:*

Be it known that I, GEORGE M. SPALDING, a citizen of the United States, and resident of St. Louis, Missouri, have invented certain new and useful Improvements in Switch-Operating Devices, of which the following is a specification containing a full, clear, and exact description, reference being had to the accompanying drawings, forming a part hereof.

My invention relates to a switch operating device, particularly intended for use in connection with the switches of street railways, and the principal object of my invention is to provide simple, strong and durable means under control of the motorman or car driver whereby the movable switch points may be shifted as desired without stopping the car or the driver leaving his position.

A further object of my invention is to provide means whereby the movable switch points of switches leading to the right and left of the main track may be readily shifted so as to cause the passage of the car over the main track rails or over either side or branch track as desired.

To the above purposes, my invention consists in certain novel features of construction and arrangement of parts hereinafter more fully set forth, pointed out in the claims and illustrated in the accompanying drawings, in which:

Figure 1 is a plan view of a portion of a main track showing two side or branch tracks diverging therefrom and with my improved switch throwing mechanism in position for use; Fig. 2 is an enlarged section taken on the line 2—2 of Fig. 1 and showing a portion of a car and a contact pin carried thereby; Fig. 3 is an enlarged transverse section taken on the line 3—3 of Fig. 1; Fig. 4 is an enlarged plan view of a portion of the switch throwing mechanism; and Fig. 5 is an enlarged plan view of the mechanism seen in Fig. 4 and said mechanism being shifted into a different position.

Referring by numerals to the accompanying drawings: 1 designates the main track rails, 2 the rails of the side or branch track leading to the right from the main track rails, and 3 the rails of the side or branch track leading to the left from the main track.

4 designates the movable switch point located at the junction of the right-hand rails 1 and 2 and which switch point controls the passage of the car onto the right-hand side or branch track, and located at the junction of the left-hand rails 1 and 3 is a movable switch point 5, which controls the passage of the car wheels onto the left-hand branch or side track.

Located in the ground between the track rails 1 and immediately to the left of the forward portion of the switch point 4 is a housing 6, and connected with the left-hand portion thereof is a forwardly projecting housing 7, which terminates adjacent the pointed end of the switch point 5.

Located between the track rails 1 a short distance in front of the housing 6 is a housing 8, the cover plate 9 of which projects above the surface of the ground or pavement, and formed in said cover plate is a series of longitudinally disposed slots 10. Connecting the housings 6 and 8 is a tube or housing 11.

Journaled for rotation on a vertically disposed pin 12, seated in the right-hand portion of the housing 6, is a horizontally disposed disk 13, and journaled on a second pin $12^a$, immediately to the left of the disk 13 and in the center of the housing 6, is a disk 14 in which is formed a pair of concentric slots 15 and 16, the same being arranged approximately at right angles to one another. Arranged for rotation on a third pin $12^b$, in the left-hand portion of the housing 6, is a disk 17 through which is formed a concentric slot 18.

19 designates a transversely disposed shifting bar which is located in the housing 6, and the right-hand end of said bar 19 is pivotally connected to the under side of the movable switch point 4.

The disk 13 is pivotally connected to the bar 19 by means of a pin 20, and passing through the slot 15 in the disk 14 is a pin 21, the lower end of which is fixed to the bar 19. A pin 22 passes through the slot 18 in the disk 17 and is seated in the left-hand end of the bar 19.

Journaled for rotation on a vertically disposed pin 23, located in the end of the housing 7, is a horizontally disposed disk 24 to which is pivotally connected one end of a transversely arranged shifting bar 25, the opposite end of which is pivotally connected to the under side of the movable switch point 5.

26 designates a rod, the ends of which are pivotally connected to the disks 17 and 24, and pivotally connected to the disk 24 is one end of a rod 27, the opposite end of which is pivotally connected to the upper end of a pin 28, which passes through the slot 16 in the disk 14.

Arranged in suitable bearings in the center of the housing 8 is a transversely disposed rod 29 on which is loosely mounted three levers—30, 31 and 32, the same being arranged immediately beneath the three slots 10 formed in the cover plate 9. Pivotally connected to the lower end of the lever 31 is one end of a rod 33, the opposite end of which is pivotally connected to the disk 13, and pivotally connected to the lower end of the lever 31 is one end of a rod 34, the opposite end of which is pivotally connected to the disk 14.

35 designates a portion preferably the platform of a car, and detachably arranged in a vertically disposed bearing 36 on said platform is a contact pin 37, the lower end of which travels in such a plane as to pass through one of the slots 10 and engage against the corresponding one of the levers 30, 31 or 32. It will be understood that these contact fingers 37 are so disposed on the car as that they will be in position to actuate the proper one of the levers. For instance, the car operating on the main track will have its contact finger so positioned as to engage the center lever 31, whereas the car traversing the right-hand side or branch track 2 has its finger so positioned as to engage the lever 30, and the finger on the car traversing the left-hand side track or branch track is positioned so as to engage the lever 32.

As seen in Figs. 1 and 2, the movable switch points 4 and 5 and the operating parts of the switch throwing mechanism are shown in such positions as that the main track is open or clear, and all of the cars traversing the main track would pass the throwing mechanism and the switch points without moving same, owing to the position of the lever 31, which is thrown forward and out of the path of travel of the finger 37 carried by the car traversing the main track. When so positioned, the levers 30 and 32, corresponding to the side or branch tracks, occupy approximate vertical position, as seen in Figs. 1 and 2, in which positions they are adapted to be engaged by the fingers carried by the cars traversing the side or branch tracks, and assuming that a car which is to traverse the right-hand side or branch track approaches the switch, the finger 37 carried by said car in passing through the right-hand one of the slots 10 will engage against the upper end of the lever 30, shifting said lever on the rod 29 and drawing the connecting rod 33 rearward. This action partially rotates the disk 13, thereby shifting the bar 19 a short distance toward the left-hand, and as a result the movable switch point 4 is so shifted as to engage the flanges of the wheels of the approaching car and switch the same onto the right-hand side or branch track. As the bar 19 shifts toward the right-hand the pin 21, carried by said bar 19, bears against the left-hand end of the slot 15 in the disk 14, thus partially rotating said disk 14, which action draws the connecting rod 34 forward to such a degree as to swing the lever 31 into a vertical position, where its upper end may be engaged by the finger 37 carried by the next car which is to traverse the main track. When the bar 19 is shifted toward the left as just described, the pin 22 will travel through the slot 18 without imparting any rotary motion to the disk 17, and consequently not affecting the disk 24 and bar 25 which is connected to the movable switch point 5. When the parts have been shifted so as to cause the car to pass onto the right-hand side or branch track, the disks and mechanism within the housings 6 and 7 occupy positions as seen in Fig. 5, and if the succeeding car is to traverse the main track, the finger 37 carried by said succeeding car will engage the upper end of the lever 31, shifting the same on the rod 29, thus moving the rod 34 rearward, in turn partially rotating the disk 14, and as the pin 21 occupies the left-hand end of the slot 15, said pin will be engaged and moved toward the right-hand, thus moving the bar 19 toward the right-hand and returning the movable switch point 4 to its original position, and which action partially rotates the disk 13, thus moving the connecting rod 33 forward and swinging the lever 30 into an approximate vertical position.

During the movement just described the disk 24 will not be actuated for the reason that during the partial rotary movement of the disk 14 the pin 28 will travel through the slot 16 and the pin 22 will travel through the slot 18.

When a car which is to traverse the left hand side or branch track approaches the switch, the finger 37 depending from said car strikes against the upper portion of the lever 32, moving the same forward, which action draws the connecting rod 34ª rearward, thus partially rotating the disk 17, which movement through the connecting rod 26 is transmitted to the disk 24, and the partial rotation of said disk 24 shifts the bar 25 a short distance to the right, thus throwing the movable switch point 5 to such a position as to guide the flanges of the car wheels onto the left hand side or branch track. During this movement the bar 19 is not affected, for the reason that as the disk 17 is partially rotated, the pin 22 travels through the slot 18 without movement, and at the same time the connecting rod 27 is shifted rearward and the pin 28 engaging against the rear end of the slot 16 partially rotates the disk 14, and as a result the rod 34 is drawn forward, which movement shifts the lever 31 into an approximate vertical position where it will be engaged by the finger 37 of the succeeding car which traverses the main track.

Thus it will be seen wherein I have provided simple, inexpensive mechanism which is automatically actuated by the approaching car, and which properly shifts the movable switch points to cause the car to traverse the main track or either branch track, according to the position of the contact pin or finger carried by the car.

I claim:

1. The combination with the movable switch points of a three-way switch of a pair of shifting bars connected to and adapted to shift the switch points from one position to another, a series of independent disks connected to one of the bars for imparting movement thereto, means connected to said disks and actuated by an approaching car for imparting movement to said disks, and connections between a pair of the disks and the opposite bar for imparting lateral movement thereto.

2. The combination with the movable switch points of a three-way switch, of independently operating shifting bars connected to said switch points, means adapted to be engaged by a contact pin carried by a passing car for imparting movement to one of the shifting bars, and an operating connection between the two shifting bars.

3. The combination with the movable switch points of a three-way switch, of laterally moving shifting bars connected to the movable switch points, a series of movable members connected to the forward one of the switch points, connections from said movable members to the rear one of the shifting bars, rods connected to the movable members, and extending along the main track in front of the switch, and levers connected to the ends of the rods and adapted to be engaged by contact fingers carried by the cars passing over the rails of the switch.

4. A three-way switch operating device, comprising a pair of laterally moving shifting bars connected to the movable switch points of the three-way switch, a series of independent disks connected to one of the shifting bars, connections between a pair of the disks and the remaining one of the shifting bars, independent rods connected to the disks, and fulcrumed levers connected to the connecting rods, and which levers are adapted to be engaged by contact pins carried by the cars passing over the rails of the switch.

In testimony whereof, I have signed my name to this specification, in presence of two subscribing witnesses.

GEORGE M. SPALDING.

Witnesses:
    M. P. SMITH,
    E. L. WALLACE.